United States Patent [19]

Landau

[11] 4,043,820

[45] Aug. 23, 1977

[54] INK CONTAINING IRON CHELATE AND POLYHYDROXY COMPOUND

[75] Inventor: Raphael Landau, Woodford Green, England

[73] Assignee: Ozalid Group Holdings, Limited, England

[21] Appl. No.: 585,754

[22] Filed: June 10, 1975

[51] Int. Cl.$^2$ .............................................. C09D 11/00
[52] U.S. Cl. ....................................... 106/21; 106/22; 106/23
[58] Field of Search ............................... 106/2, 21–23

[56] References Cited

U.S. PATENT DOCUMENTS

| | | | |
|---|---|---|---|
| 3,029,727 | 4/1962 | Gumbinner | 101/466 |
| 3,522,062 | 6/1970 | Shimizu et al. | 106/2 |
| 3,826,747 | 7/1974 | Nagashima et al. | 252/62.1 L |
| 3,850,649 | 11/1974 | Buerkley et al. | 106/21 |

*Primary Examiner*—J. Ziegler
*Attorney, Agent, or Firm*—Birch, Stewart, Kolasch and Birch

[57] ABSTRACT

An ink, capable of producing a visible trace having a high absorption for light, said ink being an aqueous solution containing a dissolved chelate of iron or titanium and a dissolved water soluble polyhydroxy compound which includes a benzene, naphthalene or unsaturated heterocyclic ring containing as substituents at least two hydroxy groups in the ortho or peri position in regard to one another with an unsaturated bond in the ring adjacent to at least one of the hydroxy groups, the ink being sufficiently acid to prevent reaction between the chelate and the polyhydroxy compound until the ink is applied to an alkaline surface.

7 Claims, No Drawings

INK CONTAINING IRON CHELATE AND POLYHYDROXY COMPOUND

This invention is concerned with an ink, primarily intended for drawing lines on a substrate which have a strong absorption for light, and in particular ultra violet light, so that they are suitable for copying on diazotype copying materials at a speed far higher than is possible with Indian ink. The ink according to the invention is primarily intended for use in computerised plotters, recorders, drawing equipment and the like, in which lines or other markings have to be made at high speed, and is suitable for such use owing to its low viscosity. It is also useful as a quick drying printing ink.

It has been proposed to apply an ink consisting of an aqueous solution of a metal chelate to a substrate sensitised with an aromatic polyhydroxy compound with the idea that a coloured trace will be formed when the ink is applied to the substrate. This procedure, however, is extremely wasteful in the component applied to the substrate in that only a minute fraction of it is brought into action in the regions where lines are drawn on the substrate. There is also a distinct possibility of undesired discolouration of the entire surface of the substrate by the polyhydroxy compound or its oxidation product.

The ink according to the invention is an aqueous solution containing a dissolved chelate of iron or titanium and a dissolved water soluble polyhydroxy compound which includes a benzene, naphthalene or unsaturated heterocyclic ring containing as substituents at least two hydroxy groups in the ortho or peri position in regard to one another with an unsaturated bond in the ring adjacent to at least one of the hydroxy groups, the ink being sufficiently acid to prevent reaction between the chelate and the polyhydroxy compound until the ink is applied to an alkaline surface.

Such an ink produces no visible mark when applied to normal paper and has to be used for writing on a substrate having an alkaline surface. When the ink is so applied the ink is neutralized by the alkali in the substrate causing the metal in the chelate to react with the aromatic polyhydroxy compound to produce a coloured trace.

Generally speaking, the ink will contain at least 5% by weight of the chelate and at least 5% by weight of the polyhydroxy compound in order to ensure the production of a trace having a commercially sufficient absorption for light and in particular ultra violet light. Preferably each of these constituents is present in an amount of at least 15% by weight. An upper limit is set by the sparing solubility of both constituents in water.

Although the anions of several organic acids, e.g. citric acid and oxalic acid, form chelates with iron and titanium, it is preferred to use the ferric sodium salt of ethylenediamine tetraacetic acid as the chelate. The ink may include a weak acid, such as citric acid to stabilize it against premature colour formation. Sorbitol ethylene glycol or glycerine may also be included to prevent over-quick drying of the ink and to assist in re-dissolution of the constituents of the ink when writing with a pen which has not been in use for a long period. However, a stronger acid, for example oxalic acid, may be used to stabilize the ink and less complexing ions can then be used in the chelate. The ink may also include the disodium salt of ethylenediamine tetraacetic acid.

While the ink is essentially an aqueous ink, it may contain an organic solvent. Thus, for example, the solvent may consist of 80% by weight of water and 20% by weight of methanol.

Preferably the stabilizing acid has the same anion as the chelate. Thus oxalic acid is preferably used when the chelate is ferric oxalate. Preferably, also, the double salt ammonium ferric oxalate is used as the chelate rather than ferric oxalate, as it is more soluble in water and so permits of the production of inks of higher concentration.

It is necessary for the iron or titanium to be present in the ink as a chelate because metal salts of strong acids, such as ferric chloride, cannot be used in the ink according to the invention since they would immediately react with the polyhydroxide to form a colour.

Preferably the polyhydroxide is devoid of an acid group since this enables substrates containing less alkali to be used. However, excellent inks can be made with polyhydroxides containing an acid group.

Examples of suitable polyhydroxides are tannic acid (the polymerised glucose ester of gallic acid), pyrocatechol pyrogallol, gallic acid, water soluble derivatives of these compounds, e.g. esters and sulphonic acids, ascorbic acid and the sodium salt of chromotropic acid, a compound containing two hydroxy groups in peri position on a naphthalene ring. The benzene or naphthalene ring must not, of course, contain substituents which would block either of the two hydroxy groups. Tannic acid is preferred to gallic acid because it is more soluble in water.

The substrate may be of paper, plastics or metal. When paper it may contain alkali introduced during manufacture on the paper mill. Normally, however, the substrate is given an alkaline surface coating.

The substrate may conveniently be a polyester film sold under the registered trade mark Melinex, which has been pretreated as described in British Patent No. 1,061,784 and then coated with polyvinyl acetate emulsion containing an alkaline substance. Many such substances are suitable, such for example as lithium hydroxide, sodium carbonate, sodium bicarbonate and guanidine carbonate or mixtures thereof.

The concentration of alkaline substance in the polyvinyl acetate layer may be reduced if the layer contains oxides, silicates or carbonates, for example of calcium, barium, zinc and magnesium, which are insoluble in water and which remain inert until exposed to acid in the ink. A smaller amount of soluble alkaline substances, such as lithium hydroxide, may then be used. The insoluble oxides, silicates or carbonates are also advantageously used as matting agents. The preferred compounds are magnesium and calcium silicates which give minimum "ghosting" after application of liquid corrector should this be required. A suitable corrector is a 10% by weight aqueous solution of citric acid, but most other acids can be used. For correction, the trace should be wetted with the corrector and wiped off with blotting paper after which the corrected area dries quickly. After rewetting the corrected area with an alkaline solution and drying, a line can be drawn on the corrected area.

When the substrate is paper the alkaline coating can be of simpler formulation and no binder, such as polyvinyl alcohol, is required.

In the following Examples parts are by weight. The first four are of coatings for application to a substrate and the Table sets out Examples of suitable inks, also in parts by weight.

Example 1

| application to Melinex film | |
|---|---|
| Polyvinyl acetate No. 8460 (obtainable from Vinyl Products Ltd.), 50% aqueous emulsion. | 50 ml. |
| Calcium or magnesium silicate dispersion in water (13%) | 100 ml. |
| Guanidine carbonate (20% aqueous) | 17 ml. |
| Aqueous 20% cationic wetting agent (as supplied by Cynamid of Great Britian). | 3 ml. |
| Aqueous 16.67% polyvinyl acrylic emulsion 4450 (as supplied by Vinyl Products Ltd.) | 10 ml. |

The constituents are added to the polyvinyl acetate emulsion in the order stated, the guanidine carbonate being added slowly with gentle stirring to avoid foam.

In use 20–30 ml of this coating solution should be used per sq. meter of film to be coated.

The following Examples are suitable for application to paper:

Example 2

| Water | 100 ml |
|---|---|
| Guanidine carbonate | 7 g |
| Cationic SN (Cyanamide) 5% solution (a wetting agent) | 1 ml |

Example 3

| Water | 100 ml |
|---|---|
| Potassium bicarbonate | 8.5 g |
| Cationic SN | 1 ml |

Example 4

| Water | 100 ml |
|---|---|
| Potassium bicarbonate | 5 g |
| Potassium carbonate | 2.5 g |
| Cationic SN | 1 ml |

The coating solution of each of Examples 2 – 4 should be applied in an amount of 10 – 15 ml per square meter of paper.

The inks which produce a water insoluble trace have the advantage that the trace will be insensitive to water spilt on the substrate on which it is written.

As may be seen from the Table, an ink containing the ferric sodium salt of ethylenediamine tetraacetic acid and pyrogallol yields a blue black trace while, if the pyrogallol is replaced by tannic acid, the trace is reddish black. Experiment has shown that if a mixture of pyrogallol and tannic acid is present in the ink, a trace having an almost neutral black colour is obtained. An ink containing titanium potassium oxalate and tannic acid gives an intense orange trace of low visual density but very suitable for printing with ultra violet light. Inclusion of a mixture of titanium and ferric chelates in the ink enhances both the visual density and the ultra violet absorption of the trace.

What I claim as my invention and desire to secure by Letters Patent is:

1. An ink, capable of producing a visible trace having a high absorption for light, said ink being an aqueous solution containing a dissolved chelate of iron, said chelate being selected from the group consisting of the ferric sodium salt of ethylenediamine tetraacetic acid and ferric ammonium oxalate, and a dissolved water soluble polyhydroxy compound which is selected from the group consisting of tannic acid, pyrocatechol, pyrogallol and gallic acid, water soluble derivatives of said tannic acid, said pyrocatechol, said pyrogallol and said gallic acid, ascorbic acid and chromotropic acid sodium salt, the ink being sufficiently acid to prevent reaction between the chelate and the polyhydroxy compound until the ink is applied to an alkaline surface, and containing at least 5% by weight of said chelate and at least 5% by weight of said polyhydroxy compound.

2. An ink as claimed in claim 1, which contains at least 15% by weight of the chelate and at least 15% by weight of the polyhydroxy compound.

3. An ink as claimed in claim 1, in which the ink contains citric acid.

TABLE

| INK COMPONENTS | 1 | 2 | 3 | 4 | 5 | 6 | 7 | 8 | 9 |
|---|---|---|---|---|---|---|---|---|---|
| Water | 10 | 10 | 10 | 10 | 10 | 10 | 10 | 10 | 10 |
| Ferric ammonium oxalate $(NH_4)_3 Fe (C_2O_4)_3 . 3H_2O$ | 1 | — | 0.6 | 0.7 | 0 | 1 | — | 1.5 | 0.4 |
| Ethylenediamine tetraacetic acid ferric sodium salt $C_{10}H_{12}O_8N_2FeNa_1H_2O$ | — | 1 | 0.5 | — | 1.1 | — | 1.2 | — | 0.7 |
| Titanium potassium oxalate $K_2TiO(CO_2)_22H_2O$ | — | — | — | 0.4 | — | — | — | — | — |
| Oxalic acid | 0.1 | 0.05 | 0.08 | 0.15 | 0.1 | 0.02 | 0.1 | 0.1 | — |
| Citric acid | — | — | — | — | — | — | — | — | 0.12 |
| Tannic acid | 1.4 | 1.3 | 1.5 | 1.5 | — | — | — | — | 0.8 |
| Chromotropic acid Sodium salt | — | — | — | — | — | — | — | 2.0 | — |
| Pyrogallol | — | — | — | — | 1.2 | — | — | — | 0.6 |
| Ascorbic acid | — | — | — | — | — | 1.0 | — | — | — |
| Catechol | — | — | — | — | — | — | 1.3 | — | — |
| Ethylene glycol | 0.5 | — | 1.0 | 0.6 | 0.5 | — | 0.5 | — | — |
| Sorbitol | — | — | — | — | — | — | — | — | 1.0 |
| Colour of the drawn line | bluish black | reddish black | almost neutral black | dark yellow grey | bluish black | bluish black | bluish black | green | black |
| Water solubility of the drawn line | insoluble | insoluble | insoluble | insoluble | soluble | soluble | soluble | soluble | partly soluble |

The inks set forth in the Table may conveniently be applied by a Rotring pen.

In making up these inks, it is preferable to dissolve the constituents in the water in the order given and the water may, if desired, be warmed to facilitate solution.

4. An ink as claimed in claim 1, in which the ink contains oxalic acid.

5. An ink, capable of producing a visible trace having a high absorption for light, said ink being an aqueous solution containing a dissolved chelate of titanium and a dissolved water soluble polyhydroxy compound which is selected from the group consisting of tannic acid, pyrocatechol, pyrogallol and gallic acid, water soluble derivatives of said tannic acid, said pyrocatechol, said pyrogallol and said gallic acid, ascorbic acid and chromotropic acid sodium salt, the ink being sufficiently acid to prevent reaction between the chelate and the polyhydroxy compound until the ink is applied to an alkaline surface, and containing at least 5% by weight of said chelate and at least 5% by weight of said polyhydroxy compound.

6. An ink as claimed in claim 5, which contains at least 15% by weight of the chelate and at least 15% by weight of the polyhydroxy compound.

7. An ink as claimed in claim 5, in which the chelate is titanium potassium oxalate.

* * * * *